UNITED STATES PATENT OFFICE.

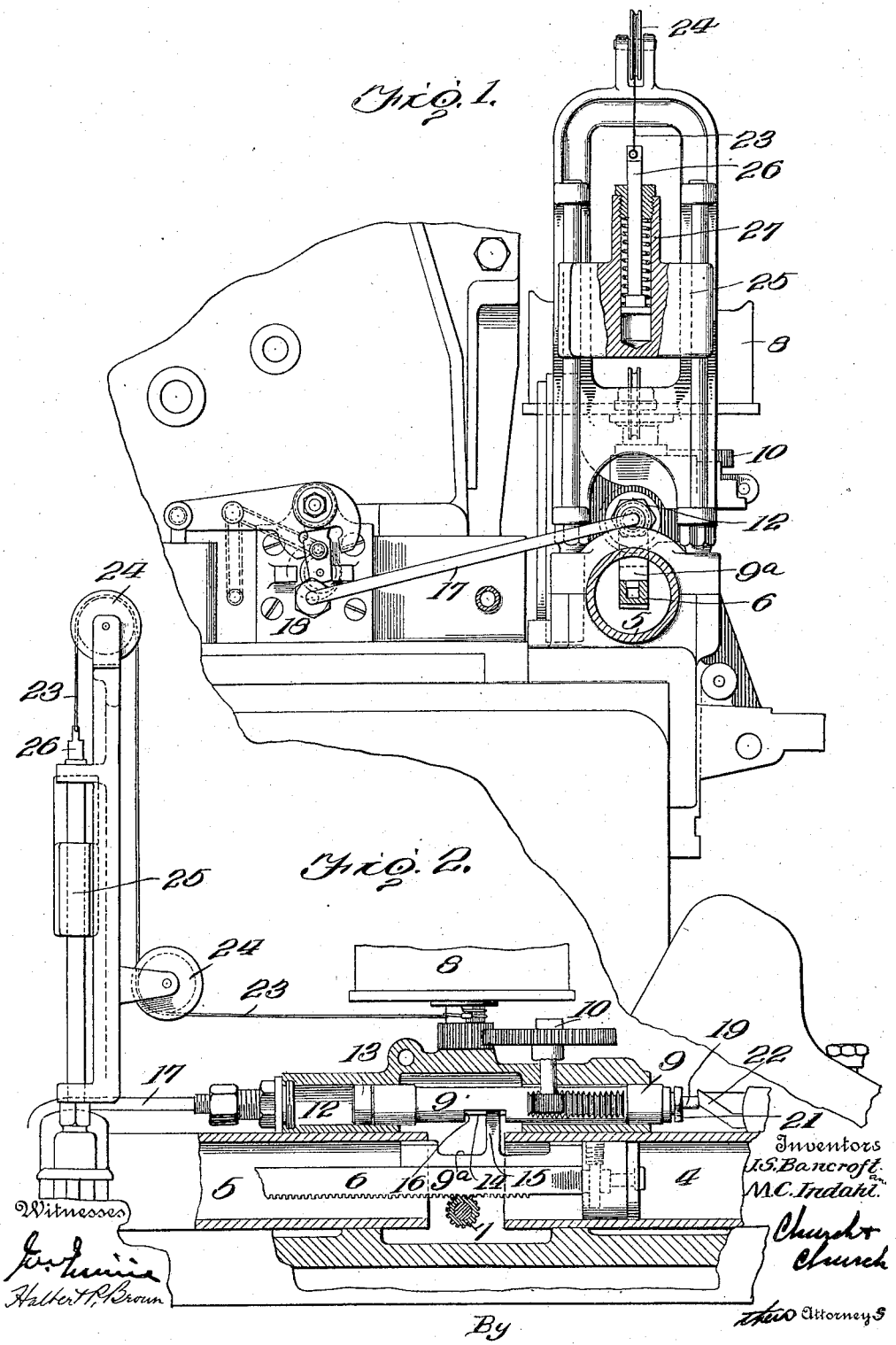

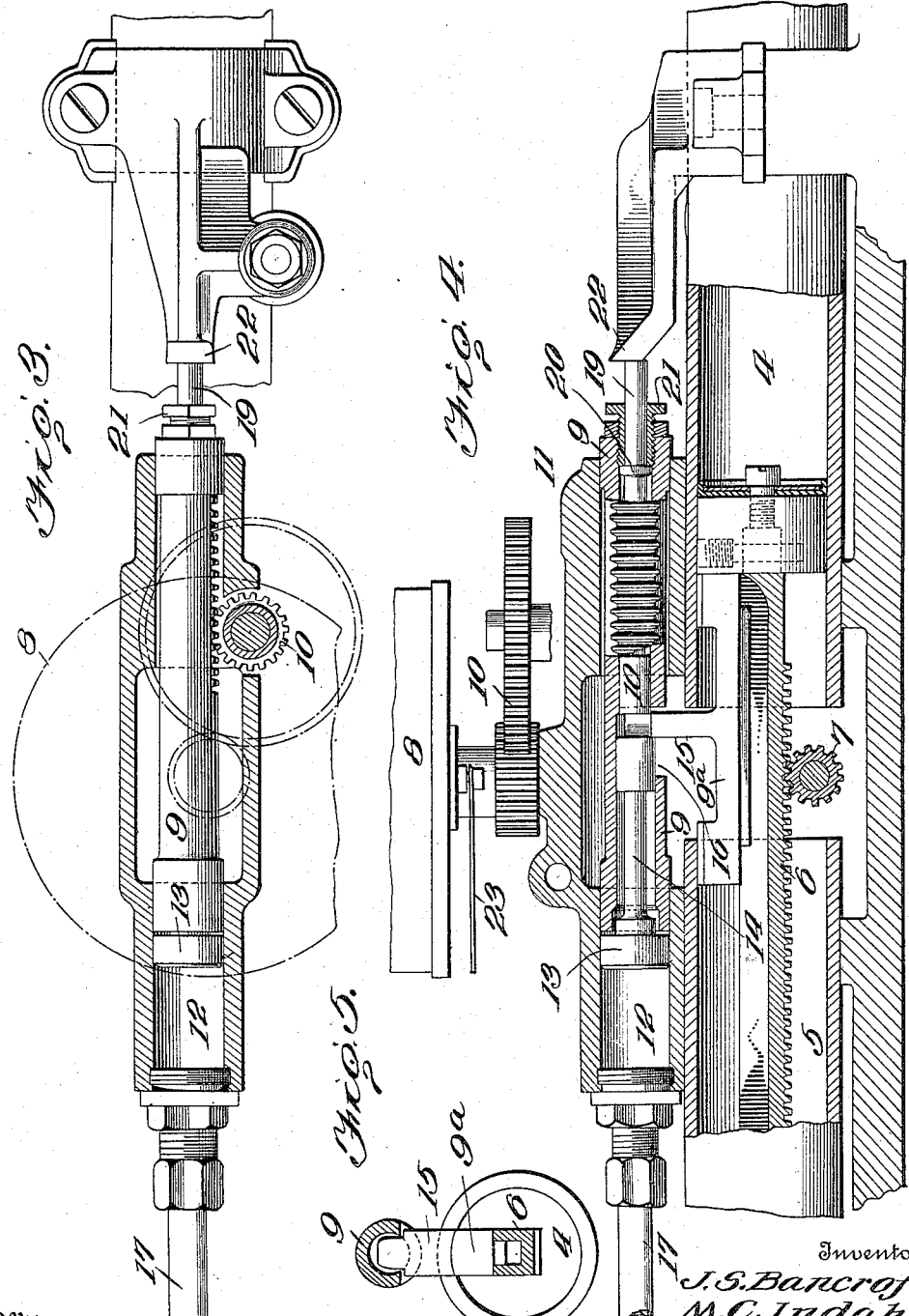

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CONTROLLER COMPOSING MECHANISM.

1,149,176.     Specification of Letters Patent.     Patented Aug. 10, 1915.

Application filed March 12, 1914. Serial No. 824,180.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Controller Composing Mechanism; and we do hereby declare the following to be a full, clear, and exact description of the same, reference being had to the accompanying drawings, forming part of this specification, and to the figures and letters of reference marked thereon.

This invention relates to improvements in justification indicating mechanism for typographic composing machines of the class illustrated in Patent No. 654,115, dated July 17, 1900, wherein the indicator drum receives its setting from a motor driven escapement-controlled line admeasuring mechanism. According to said patent the line admeasuring and indicator actuating mechanisms are coupled to move in unison while traversing what is known as the justification area, i. e. that portion of the end of the measure which may be absorbed by justification, the connection being made through rack and pinion gearing. The advantages of such an arrangement are that the adjustments of the indicator drum are automatically produced while composition is being performed so that the operator can ascertain at a glance when to close the line and with what signals. But the speed capacity of the machine was limited by reason of the inertia of the parts under the sudden starting and stopping action of the line admeasuring mechanism, resulting in mutilation of the transmitting elements as well as in prolonging the motion of the drum so as to cause more or less vibration or dancing in the intervals between successive feed movements, which greatly interfered with a reading of the index. To remove this speed limitation the indicating mechanism was reorganized by eliminating the running connection between the line admeasuring mechanism and the indicator actuating devices and providing the latter with a key controlled motor, whereby when it was desired to take a reading from the indicator drum, the special key was operated to advance the indicator drum until arrested by contact of its actuating devices with a member of the line admeasuring mechanism, after the manner disclosed in Patent No. 944,405, dated December 28, 1909. This new arrangement, while eliminating the destructive effect of inertia and increasing the speed capacity of the mechanism itself, introduced a retarding element to composition, in that it required the operator to actuate the special key one or more times for each line, an operation consuming valuable time, tending to distract attention from copy, and correspondingly diminishing the output. The developments in this line indicated the desirability of a return to the running connection of the first named patent, whereby the entry of the line into and its position within the justification area were automatically indicated without the expenditure of effort or time on the part of the operator, provided the mechanical defects of the running connection could be satisfactorily avoided or overcome.

This result has been attained by the present invention wherein the line admeasuring mechanism is transformed from a driving into a gaging element for the indicator actuating devices, and the latter is advanced under the influence of its own separate motor and caused to follow up the movements imparted to said gaging element. By thus providing a separate motor for the indicator actuating devices and causing the latter to automatically follow instead of accompany the line admeasuring mechanism, the rate of motion and consequently the amount of inertia developed by the indicator actuating devices can be controlled and brought within limits, independently of the rate of motion of the line admeasuring devices and within the interval between successive advances of said line admeasuring mechanism so that without diminution in the speed capacity of the machine the integrity of the indicator actuating devices is preserved.

In the accompanying drawings illustrating a preferred form of embodiment of the invention, Figure 1 is an end elevation and Fig. 2 a front elevation, partly in section of a portion of the composing machine with the improvements applied thereto. Fig. 3 is a horizontal section and Fig. 4 a vertical section through the improved running connection in association with the coöperative points of the line admeasuring and indicator actuating devices of the composing machine, the same being on an enlarged scale. Fig. 5 is a detail sectional view showing the manner of arranging the abutment or gaging member.

The same numerals designate like parts in the several views.

For purposes of illustration the invention is shown applied to the high speed machine of Patent No. 944,405 to which reference is had for a detailed description.

It will suffice, for present purposes, to designate and identify some of the parts of the patented machine shown in the drawings and more directly involved herein, such as the motor cylinder 4, motor return cylinder 5, motor rack 6, and units wheel shaft and pinion 7 constituting elements of the line admeasuring mechanism; justification indicator drums 8 coupled with the transmission gearing of the indicator actuating devices; and abutment slide $9^a$ constituting the connection between the line admeasuring mechanism and the indicator actuating devices.

The reference numerals thus far employed are the same as those applied to the corresponding parts of the prior patent referred to, with the exception of 8 which in the patent designates a part of the escapement, to-wit, the units wheel, instead of its shaft.

The justification indicator rack of the patent referred to is replaced by a gaging member 9 having rack teeth on the side thereof and connected to the indicator drum through multiplying gearing 10, one end of said gaging member being supported in a bearing 11 and the other in a cylinder 12, both formed in the supporting frame.

Riding within cylinder 12 is a piston 13, the inner end of whose rod 14 is guided in gaging member 9 and is held under elastic pressure against the arm 15 of abutment slide $9^a$, said arm extending through an elongated opening 16.

Cylinder 12 is maintained in open communication with the air pressure supply through pipe 17, as by connecting said pipe with the chest of the paper feed valve mechanism 18, Fig. 1.

Supported in bearings in gaging member 9 in position to engage abutment slide $9^a$ and disposed in opposition to piston rod 14 is a follower or pin 19 provided with a shoulder 20 adapted to engage an adjustable sleeve or bearing 21 carried by member 9. Pin 19 extends beyond member 9 in position to engage a bearing 22 on the frame.

The sole purpose in making the contacting element of the gaging member in the form of the adjustable follower 19 is to provide means for setting the drum in proper relation to the abutment member, and but for this the contacting point might be integral with or fixed upon said gaging member.

To indicator drum 8 is connected one end of a cord 23, the latter passing around directing pulleys 24 and having its opposite end attached to a depending weight 25, the latter serving as a motor and tending constantly to advance gaging member 9 toward piston 13.

In order that the motor may be caused to exert a constant and uniform pressure and be rendered more prompt in its action, instead of attaching the cord directly to the weight it is attached to a bolt 26 movable in guides in the weight, a spring 27 being interposed between said bolt and weight so that the pressure exerted by the latter will be transmitted through the spring.

The spring being much quicker in action than the weight acts first in advancing the indicator actuating devices and its power is then renewed by the subsequent fall of the weight, in other words, the weight operates to wind the spring up to its original tension after each action.

The pressure exerted by piston 13 on abutment slide $9^a$ is opposed to and exceeds that exerted by the motor 25 on gaging member 9, and so long as the motor rack 6 remains out of engagement with abutment slide $9^a$, said piston operates to retract the abutment slide against the pressure of motor 25 until arrested by the engagement of pin 19 with bearing 22. This position of abutment slide $9^a$ with relation to the engaging shoulder on motor rack 6 corresponds to the beginning or entrance to the justification area, and to the retracted or zero position of the indicator drum. By advancing or retracting bearing 21 and thereby varying the position of member 9 with relation to pin 19, the zero position of the indicator drum can be varied or adjusted.

The construction and arrangement described is such that when the indicator actuating devices occupy their normal or retracted position, and until the motor rack 6 enters the justification area and, in consequence thereof, moves abutment member $9^a$, said abutment member remains clamped between piston rod 14 and pin 19 with the latter in contact with bearing 22, owing to the preponderance of pressure exerted by piston 13 over that exerted in the opposite direction by motor 25. When, during the advance of the motor rack, it engages and picks up the abutment slide, the latter, acting upon piston rod 14, displaces it by an amount equal to the measured advance movement of the motor rack as determined by the escapement, thereby temporarily removing the previously existing obstacle to the advance of the indicator actuating devices and permitting them to respond to the pressure of motor 25.

It will be seen, therefore, that member 9ª no longer operates as a transmitting member for the indicator actuating devices, but rather as a movable stop for gaging the extent of motion permitted said actuating devices under the pressure of motor 25. It results that corresponding movements of the line admeasuring and indicator actuating mechanism are no longer required to be performed in the same time, so that by a proper regulation of the pressure exerted by the indicator actuating mechanism motor, the speed of said mechanism as compared with that of the line admeasuring mechanism can be reduced and brought well within the limits of safety, and this too without in any degree diminishing its capacity to register each movement.

A further advantage gained through this slowing down of the indicator actuating devices is increased stability of the indicator drum immediately after an adjustment has been effected, as it is no longer subjected to the powerful action of the motor rack motor but merely to that of its own special and lighter motor, and to a continuous instead of an intermittent pressure, while the vibrations of the abutment member are checked by the opposing pressures of the two motors.

Upon the return of the line admeasuring mechanism through the admission of pressure in the motor return cylinder, the superior pressure on piston 13 restores the indicator actuating devices and abutment slide to initial or starting position.

Having thus described our invention, what we claim as new and desire to secure by Letters Patent of the United States is,—

1. In a typographic composing machine such as described, including line admeasuring mechanism and indicator actuating devices, and in combination therewith, an abutment slide adapted to be engaged and moved by the line measuring mechanism, a motor for said abutment slide acting in opposition to the line admeasuring mechanism, and a motor coupled with the indicator actuating device to move the latter into contact with said abutment slide, said motor operating in opposition to the abutment slide motor.

2. A composing machine equipped with an intermittently operating line admeasuring mechanism, an indicator, and actuating devices for controlling the position of the indicator, and in combination therewith, the following elements, to-wit, an abutment member engaged by the line admeasuring mechanism at a predetermined point in its line of travel; a motor device engaging the abutment member to continuously oppose the advance of said line admeasuring mechanism; and a constant pressure motor of less power than the abutment motor connected with the indicator actuating devices and operating against the abutment member in opposition to its said motor.

3. In a composing machine such as described, the combination of the following elements, to-wit; a motor driven escapement controlled line admeasuring mechanism; a movable indicator or drum; actuating devices for the indicator including a continuously acting motor operating to advance the indicator in one direction; an abutment member interposed between the line admeasuring mechanism and the indicator actuating devices, said abutment member occupying a position on the advancing side of both the line admeasuring mechanism and the indicator actuating devices to be moved by the former and to restrain the movement of the latter; and a constantly acting motor operating upon said abutment member in opposition to the motors of the line admeasuring mechanism and indicator actuating devices.

4. In a composing machine such as described, the combination of the following elements, to-wit: a motor driven line admeasuring mechanism; indicator actuating devices including a one way actuating motor; an independently movable abutment member provided with a one way actuating motor, said movable abutment being located within the paths of movement of the line admeasuring mechanism and of the indicator actuating devices with its motor opposed to those of the line admeasuring and indicator actuating mechanisms and exerting less power than the line admeasuring motor and greater power than the indicator motor, whereby, during the advance of the line admeasuring component, the abutment member is displaced against the pressure of its motor and the indicator actuating component is advanced by its motor until arrested by the abutment.

5. In a composing machine, the combination of the following elements, to-wit; a line admeasuring mechanism; an indicator actuating mechanism including an impelling motor and a gaging member; an independently movable abutment member in position to be engaged by said gaging member and provided with a constantly acting motor opposing the indicator motor, said abutment member projecting into the path of the line admeasuring mechanism; and a bearing for arresting the indicator actuating devices when retracted by the abutment motor.

6. In a composing machine, the combination of the following elements, to-wit: a line admeasuring mechanism; an independently movable abutment member disposed in the line of movement of the line admeasuring mechanism; a constantly acting motor engaging the abutment member and acting in opposition to the line admeasuring mechanism; indicator actuating devices including a gaging member contacting with the abutment member in opposition with said motor; and a constantly acting motor coupled with the indicator actuating devices the same including a weight held in suspension upon a spring, the latter connected to the indicator actuating devices.

7. In a composing machine provided with a line admeasuring mechanism including a motor rack and with an indicator and actuating devices therefor, and in combination therewith, the following elements, to-wit: an independently movable abutment member in position to be engaged by a shoulder on said motor rack; a cylinder and a guideway arranged in tandem parallel with the abutment member; a tubular member guided at opposite ends in said cylinder and bearing, respectively, and provided with external rack teeth forming part of the indicator actuating device, and an opening for the reception of an arm on the abutment member; a piston riding in said cylinder with its rod extending within said tubular member and engaging the arm of the abutment member; a follower mounted in said tubular member and engaging the abutment member in line with but on the side opposite the piston rod; and an adjustable bearing on said tubular member engaging the follower.

8. In a composing machine provided with indicator actuating devices including a constantly acting motor and a tubular gaging member and a line admeasuring mechanism provided with an intermittently driven member, and in combination therewith, an independently movable abutment member in position to be engaged in one direction by a shoulder on said driven member of the line admeasuring mechanism, and provided with an arm secured within an opening in said tubular gaging member; a piston working in a cylinder with its rod extended into said tubular gaging member and engaging one side of the abutment member arm; a follower located within the tubular gaging member and contacting with said arm on the side opposite the piston rod; means for adjusting the position of said follower relatively to the tubular gaging member; and a bearing against which said follower contacts, to position the indicator actuating devices relatively to said bearing and abutment member.

JOHN SELLERS BANCROFT.
MAURITZ C. INDAHL.

Witnesses:
SAMUEL A. FRASER,
SAMUEL R. DAVIS.